United States Patent
Aja et al.

(10) Patent No.: US 6,412,441 B1
(45) Date of Patent: Jul. 2, 2002

(54) EXPERIMENTAL CAGE HAVING A QUICK CHANGE FLOOR AND WASTE COLLECTION ASSEMBLY AND CONTACT POINTS REMOVABLE FOR CLEANING

(75) Inventors: Joseph Gonzalo Aja, Williston; Karl Richard Zurn, Burlington; Joaquin Peter Aja, Colchester; Russell Gene Hardy, St. Albans, all of VT (US)

(73) Assignee: MED Associates Inc., Georgia, VT (US)

( * ) Notice: Subject to any disclaimer, the term of this patent is extended or adjusted under 35 U.S.C. 154(b) by 0 days.

(21) Appl. No.: 09/770,095

(22) Filed: Jan. 25, 2001

(51) Int. Cl.[7] ................................................. A01K 1/03
(52) U.S. Cl. ....................................... 119/417; 119/416
(58) Field of Search ................................. 119/416, 417, 119/450, 458, 728, 421

(56) References Cited

U.S. PATENT DOCUMENTS

| | | | | |
|---|---|---|---|---|
| 2,796,044 A | * | 6/1957 | Breland | 119/475 |
| 3,234,907 A | * | 2/1966 | Palencia | 119/474 |
| 3,297,907 A | * | 1/1967 | La Rue et al. | 315/5.24 |
| 3,397,676 A | * | 8/1968 | Barney | 119/417 |
| 3,429,297 A | * | 2/1969 | Schroer | 119/417 |
| 3,439,358 A | * | 4/1969 | Salmons | 340/552 |
| 3,467,064 A | * | 9/1969 | Bailey | |
| 3,516,389 A | * | 6/1970 | Meyer | |
| 3,540,413 A | * | 11/1970 | Castaigne | |
| 3,602,195 A | * | 8/1971 | Blough | |
| 3,626,902 A | * | 12/1971 | Orfel | 119/6.5 |
| 3,633,001 A | * | 1/1972 | Vajnovszky | 340/561 |
| 3,693,590 A | * | 9/1972 | Bowers | 119/421 |
| 3,698,360 A | * | 10/1972 | Rubricius | 119/421 |
| 3,830,201 A | * | 8/1974 | Coulbourn | 119/417 |
| 3,974,798 A | * | 8/1976 | Meetze, Jr. | 119/421 |
| 4,651,675 A | * | 3/1987 | Collier | 119/416 |
| 4,869,206 A | * | 9/1989 | Spina | 119/417 |

* cited by examiner

Primary Examiner—Charles T. Jordan
Assistant Examiner—Judith A. Nelson
(74) Attorney, Agent, or Firm—Elman & Associates; Gerry J. Elman

(57) ABSTRACT

An animal cage that holds the cage floor and waste collection assembly in place without the use of mechanical fasteners so that the assembly may be removed for cleaning and replaced by another assembly in minimal time. Also provided is the floor and waste collection assembly that is held in place without the use of mechanical fasteners and is removable for cleaning and replacement by another assembly in minimal time. A quick change electrical connection to provide shock current to the floor of the assembly is accomplished by creating pressure contact between conductive floor bars and electrical contacts of a circuit board in the rear support block of the cage.

12 Claims, 8 Drawing Sheets

EXPERIMENTAL CAGE HAVING A QUICK CHANGE FLOOR AND WASTE COLLECTION ASSEMBLY AND CONTACT POINTS REMOVABLE FOR CLEANING

Animal cages have been used for conducting experiments on a wide variety of laboratory organisms including rats, mice, pigeons, squirrel monkeys, and guinea pigs. For this purpose, researchers can select either a test cage specially designed for a particular test animal or a modular cage. In the past, such test cages have included a fixed or removable grid or a wire mesh floor upon which the animal stands as well as a waste collection device located beneath the floor. Also, in the past, some manufacturers of test cages have mounted in a semipermanent way the grid floors to the walls of the cage and positioned the waste collection device below the grid floor. Thus, in some past test cages, the floor and waste collection assembly has been an integral part of the cage. In other previous test cages, the floor and waste collection assembly has been removable as a separate element. Moreover, even in past cages with removable assemblies and with floor bars that allowed electrical shocking of the test animal, a researcher could not simply detach the assembly from the cage. This was so because the floor bars of past assemblies were connected to an electric shocking apparatus in such a manner so that each electrical connection had to be first disconnected from each floor bar before removal and replacement of the grid floor for cleaning and sanitation.

In conducting animal experiments, it is often required that the scent and all other traces of a test animal be removed prior to the entry of a subsequent test animal into the cage. Regardless of what kind of test cage is used, to de-scent and/or sanitize a cage, a researcher must remove the floor and/or the waste collection device, clean them and replace them with a cleaned set. In the past, sanitizing a cage demanded replacement of two separate movable parts. Specifically, the sanitation of past cages has been cumbersome and time-consuming because the floor and the waste collection device have had to be disconnected from each other, removed, cleaned and then reattached before insertion into the cage.

Moreover, in conducting animal experiments, it is often needed to deliver an electrical shock to the feet of the test animal. For this purpose the grid or mesh floors of past test cages have been adapted to conduct electricity by directly connecting an electrical contact to each floor bar. Therefore, replacing a soiled floor and waste collection assembly in the past has required disconnection of each individual hard wired contact to each floor bar followed by re-attachment of each contact to the cleaned floor bars.

The following United States patents may be of interest to provide background to past test cages:

U.S. Pat. No. 2,796,044 issued to Breland; U.S. Pat. No. 3,234,907 issued to Palencia; U.S. Pat. No. 3,297,907 issued to Evans; U.S. Pat. No. 3,397,676 issued to Barney; U.S. Pat. No. 3,429,297 issued to Schroer; U.S. Pat. No. 3,467,064 issued to Glass, et. al.; U.S. Pat. No. 3,516,389 issued to Meyer; U.S. Pat. No. 3,540,413 issued to Castaigne; U.S. Pat. No. 3,602,195 issued to Blough; U.S. Pat. No. 3,467,064 issued to Bailey, et. al.; U.S. Pat. No. 3,626,902 issued to Orfei; U.S. Pat. No. 3,693,590 issued to Bowers; U.S. Pat. No. 3,698,360 issued to Rubricius; U.S. Pat. No. 3,830,201 issued to Coulbourn; U.S. Pat. No. 4,651,675 issued to Collier; U.S. Pat. No. 4869,206 issued to Spina.

Before now, test cages and floor waste collection assemblies that allow quick removal and replacement for cleaning have not been available. Moreover, test cages and floor-waste collection assemblies that allow a researcher to carry out shock and non-shock experiments as needed have also not been available before now.

The present invention provides a test cage that allows a researcher to quickly change the floor and waste collection assembly and to conduct both shock and non-shock experiments as needed without having to disconnect the electrical connections or alter the structural integrity of the cage. In addition, the present invention also provides a quick change floor and waste collection assembly used in a test cage, which assembly allows a researcher to quickly change the floor and waste collection assembly and to conduct both shock and non-shock experiments as needed without having to alter the electrical connections between the floor and the cage or the structural integrity of the cage. The present invention also provides a method of conducting animal experimentation and for cleaning test cages without altering electrical connections between the floor and the cage or the structural integrity of the cage.

By re-designing the floor and waste collection assembly as well as the structural relationship between the assembly and the cage, the present invention offers an efficient research chamber. The cage and assembly of the present invention may be used with a variety of test animals, and for both shock and non-shock experiments without having to alter electrical connections between the floor and the cage or the structural integrity of the cage. With the present invention, a user may quickly remove from a test cage the scent and waste traces of the previous animal prior to introducing the next animal.

DETAILED DESCRIPTION

Figure 1:
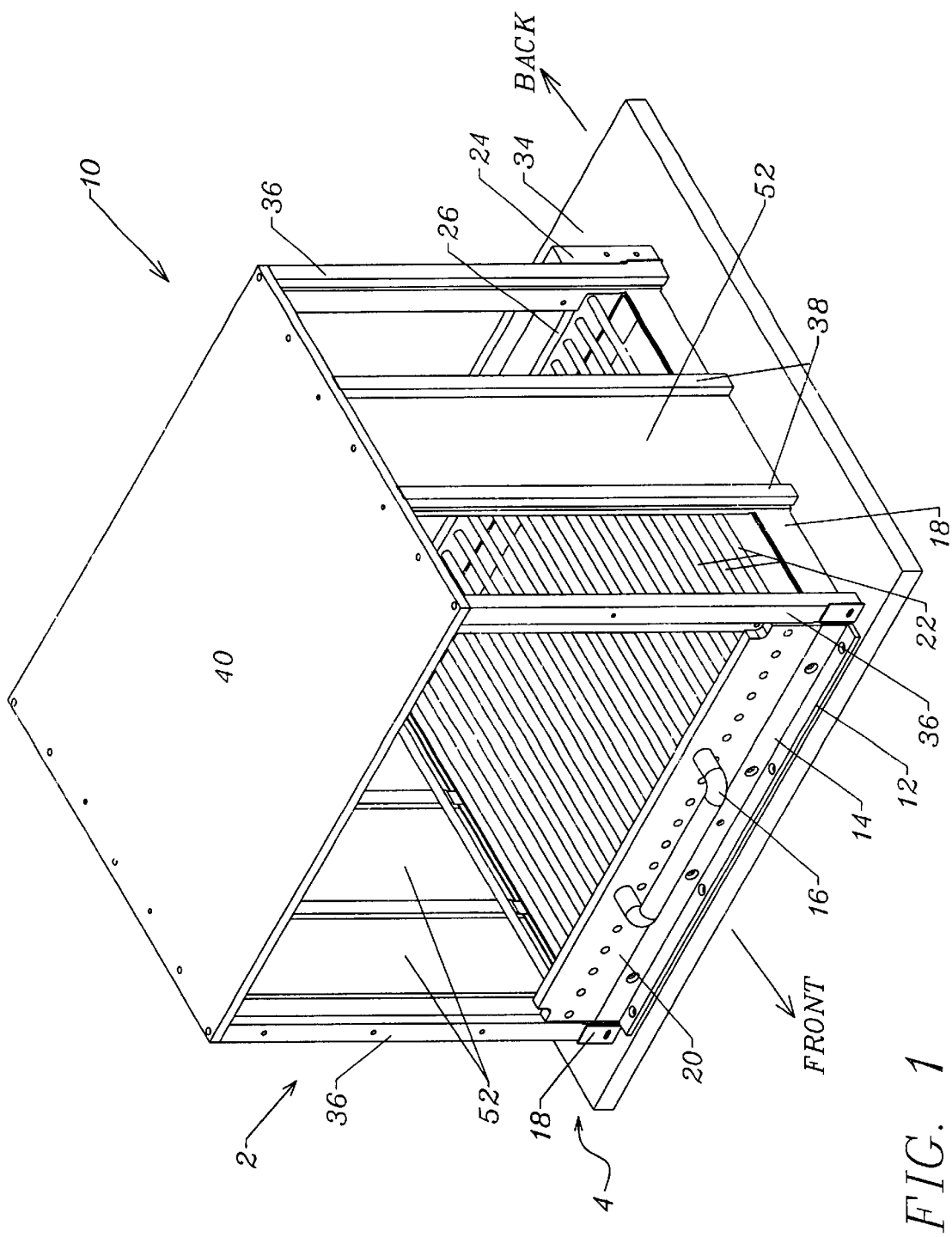
FIG. 1 illustrates an embodiment of the quick change test cage of the present invention.

FIG. 1 shows an embodiment of a test cage 10 of the present invention. Cage 10 comprises a cage frame 2 and a quick change floor and waste collection assembly 4. The cage frame 2 comprises a cage roof 40, a cage base 34, corner supports 36, side supports 38, front, back and side walls 52, a front lock bar 12 and guide strips 18. The cage roof 40 and cage base 34 are secured in a semipermanent manner, such as by bolt, screw, or the like, to corner supports 36 and to side supports 38.

Figure 2:
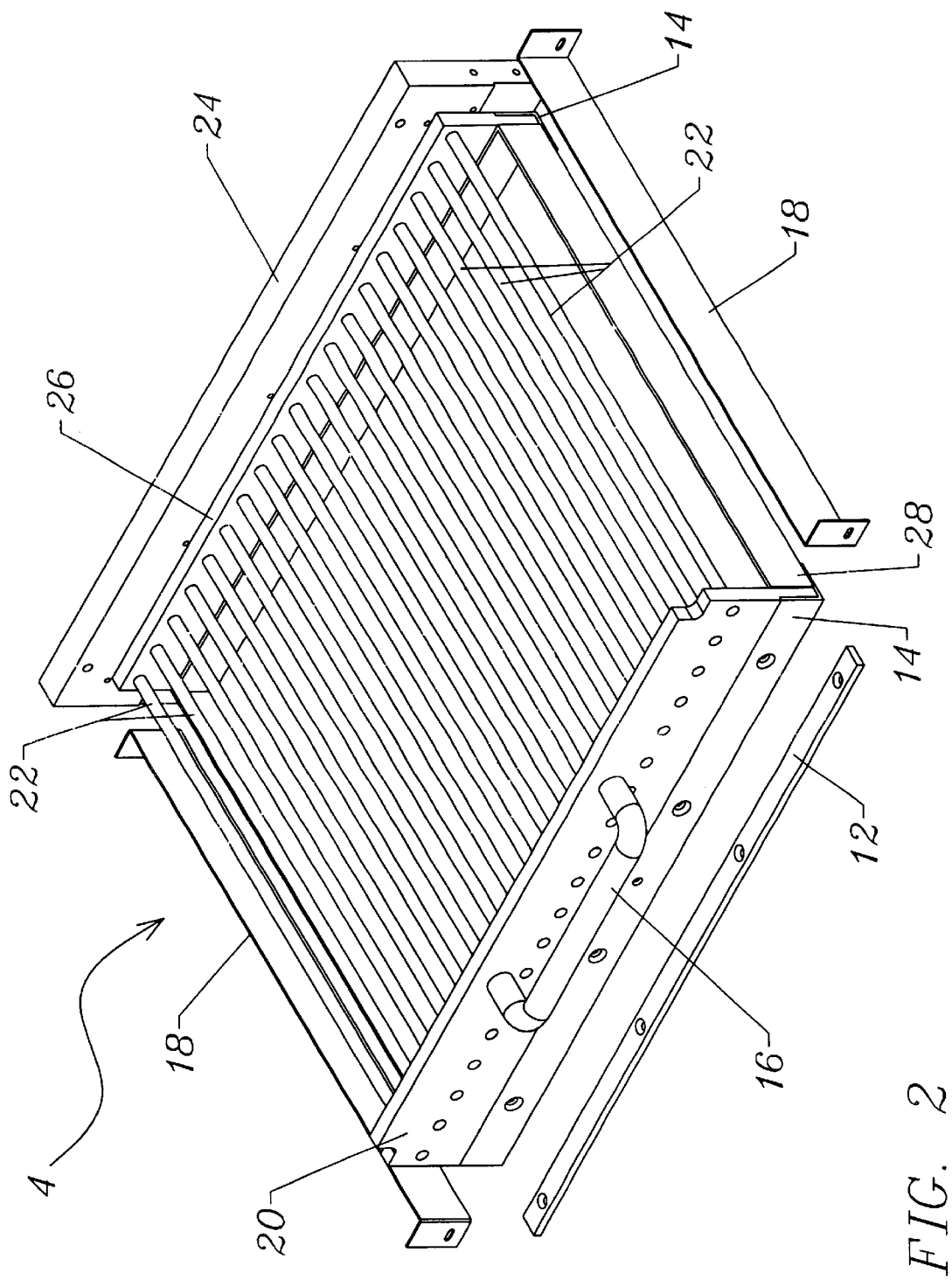
FIG. 2 illustrates an embodiment of the quick change floor and waste collection assembly of the present invention, showing an exploded view of the locking and guide hardware.
Figure 3:
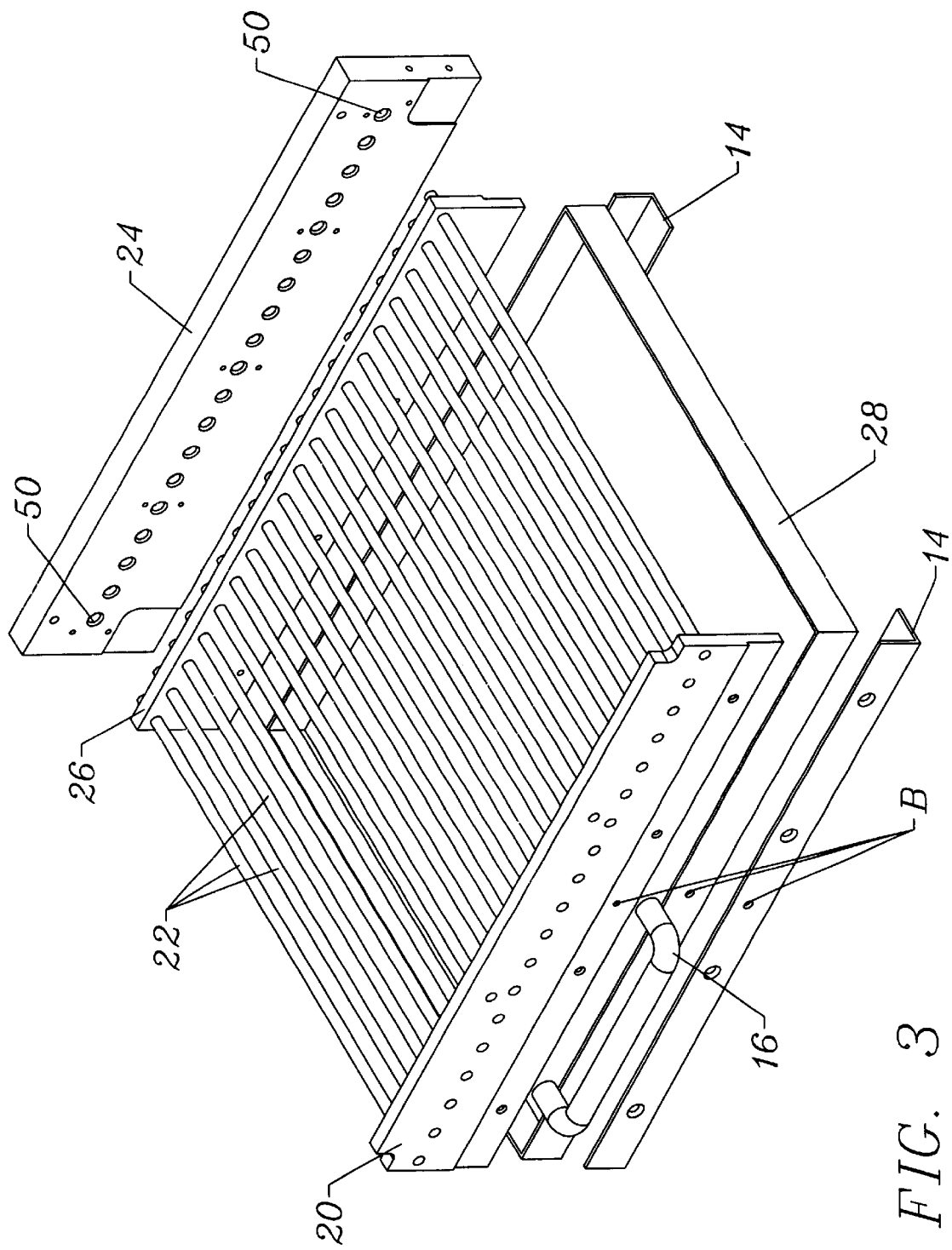
FIG. 3 shows an exploded view of the waste pan hardware and the contact block of the embodiment of shown in FIG. 2.

With continuing reference to FIG. 1, FIGS. 2 and 3 show an embodiment of quick change floor and waste collection assembly 4 of the present invention. This embodiment is adapted to allow both shock and non-shock experimentation as needed. It comprises the floor elements 14, 16, 20, 22, 26 and the waste pan 28. The entire quick floor and collection assembly 4 glides between corner supports 36 and side supports 38 along guide strips 18. These are attached by bolt, screw or the like to the inner surface of corner supports 36, as shown in FIG. 1. Guide strips 18 facilitate insertion of assembly 4 into cage 10 by providing a continuous surface along which rear floor support 26 and waste pan 28 glides. Guide strips 18 also prevent side supports 38 from hindering the action of pushing rear floor support 26 next to contact block 24. As shown in FIGS. 2 and 3, an embodiment of the quick change floor comprises a nonconductive front floor support 20, a nonconductive rear floor support 26 and a plurality of electrically conductive floor bars 22. The floor bars 22 are attached in a permanent manner, such as by press fit, an adhesive bond or the like, to front floor support 20 and rear floor support 26.

Two waste pan supports 14 are attached, one to front floor support 20 and the second to rear floor support 26 in a permanent manner. As shown in FIG. 3, the waste pan 28 is situated between the front 20 and the rear 26 floor supports. A single bolt, screw or the like, its position indicated by B in FIG. 3, attaches the waste pan to front floor support 20. After removal of B, the waste pan is free to slide to either side for easy detachment from the floor subassembly. Thus, the waste pan may be removed for separate cleaning during experimentation, if needed. Alternatively, it may remain attached to the assembly during experimentation, and be removed from the cage with the entire assembly. After the assembly is removed, the waste pan may then be detached and cleaned separately or remain attached and be cleaned with the entire assembly. Detachability of the waste pan allows the researcher flexibility to use a variety of cleaning and de-scenting approaches.

Front lock bar 12, especially as shown in FIG. 1, is permanently attached to cage base 34 and is constructed of a rigid material. Front lock bar 12 provides a locking-in mechanism for the floor and waste collection assembly 4 and prevents forward movement of the assembly when the assembly is properly inserted and positioned in cage 10. As FIGS. 1 and 2 show, a handle 16 which is permanently attached to front floor support 20, facilitates lifting front floor support 20 up and over front lock bar 12. As shown especially in FIG. 2, the guide strips 18 prevent longitudinal movement of assembly 4 when it is positioned in cage 10.

Figure 5:
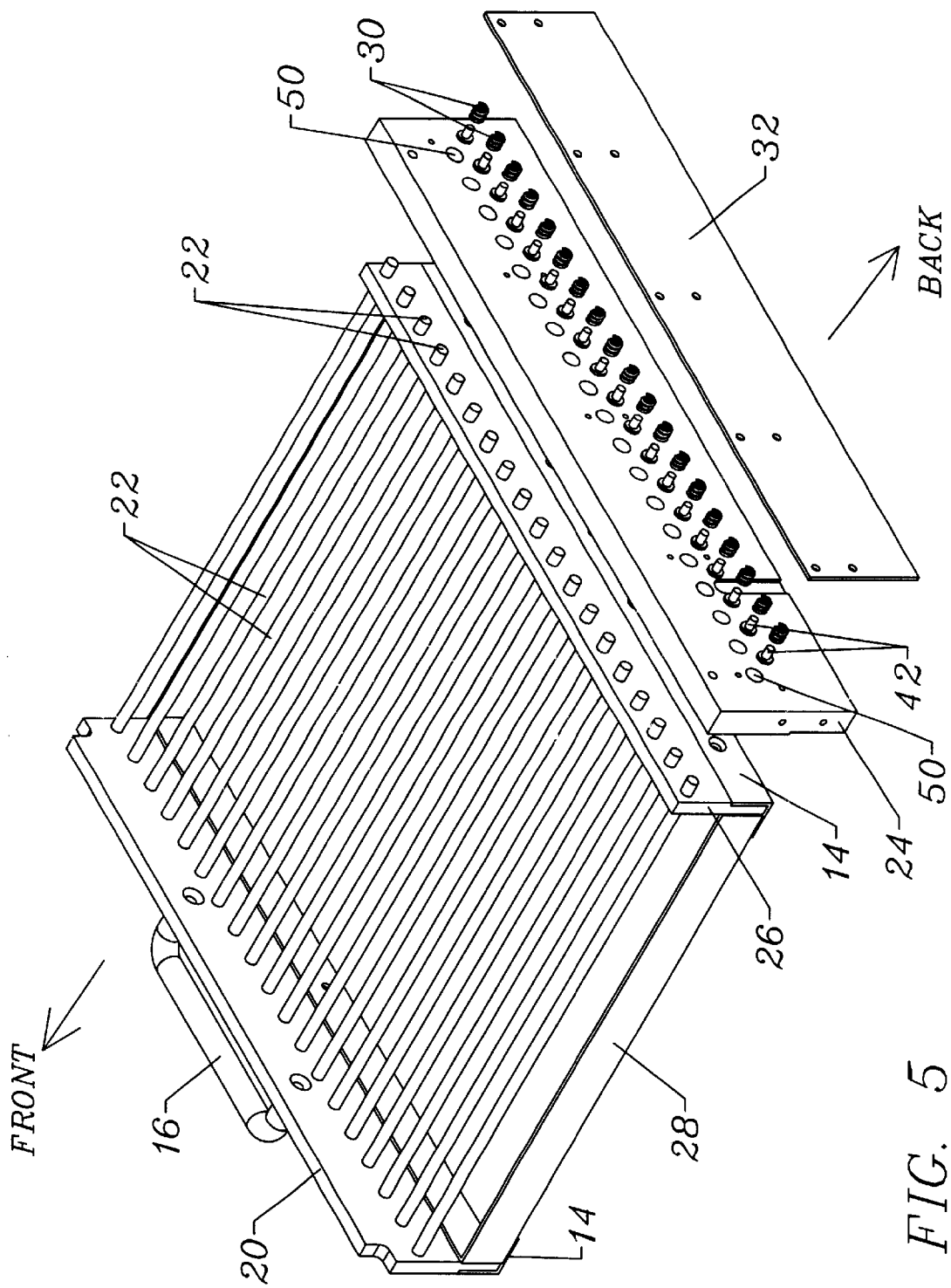
FIG. 5 illustrates in perspective an embodiment of the assembly of the present invention, showing an exploded view of the hardware residing in and connected to the contact block as well as the relationship of the floor to the rear floor support and to the contact block.

As shown in FIGS. 1 and 2, contact block 24, which is attached to cage base 34 in a semipermanent manner, such as by bolt, screw or the like, prevents backward movement of the assembly 4. As FIG. 5 shows, contact block 24 comprises a plurality of holes 50, a matching plurality of contact pins 42 and contact springs 30. FIGS. 5 and 6A show that situated within each hole 50 is a contact spring 30, which houses a contact pin 42. In embodiments of the floor and waste collection assembly suitable for both shock and non-shock experiments, the contact pins 42 and springs 30 comprise a conductive material.

FIG. 5 shows contact plate 32 attached in a semipermanent manner to the outer surface of contact block 24. In embodiments of the assembly suitable for both shock and non-shock experiments, the contact plate 32 comprises a circuit board, with contact points that correspond to the location of the holes 50 in contact block 24. Other embodiments where electrical conductivity must be kept to an absolute minimum do not comprise a circuit board and contact plate 32 comprises a material suitable for minimizing electro-conductivity.

Figure 4:
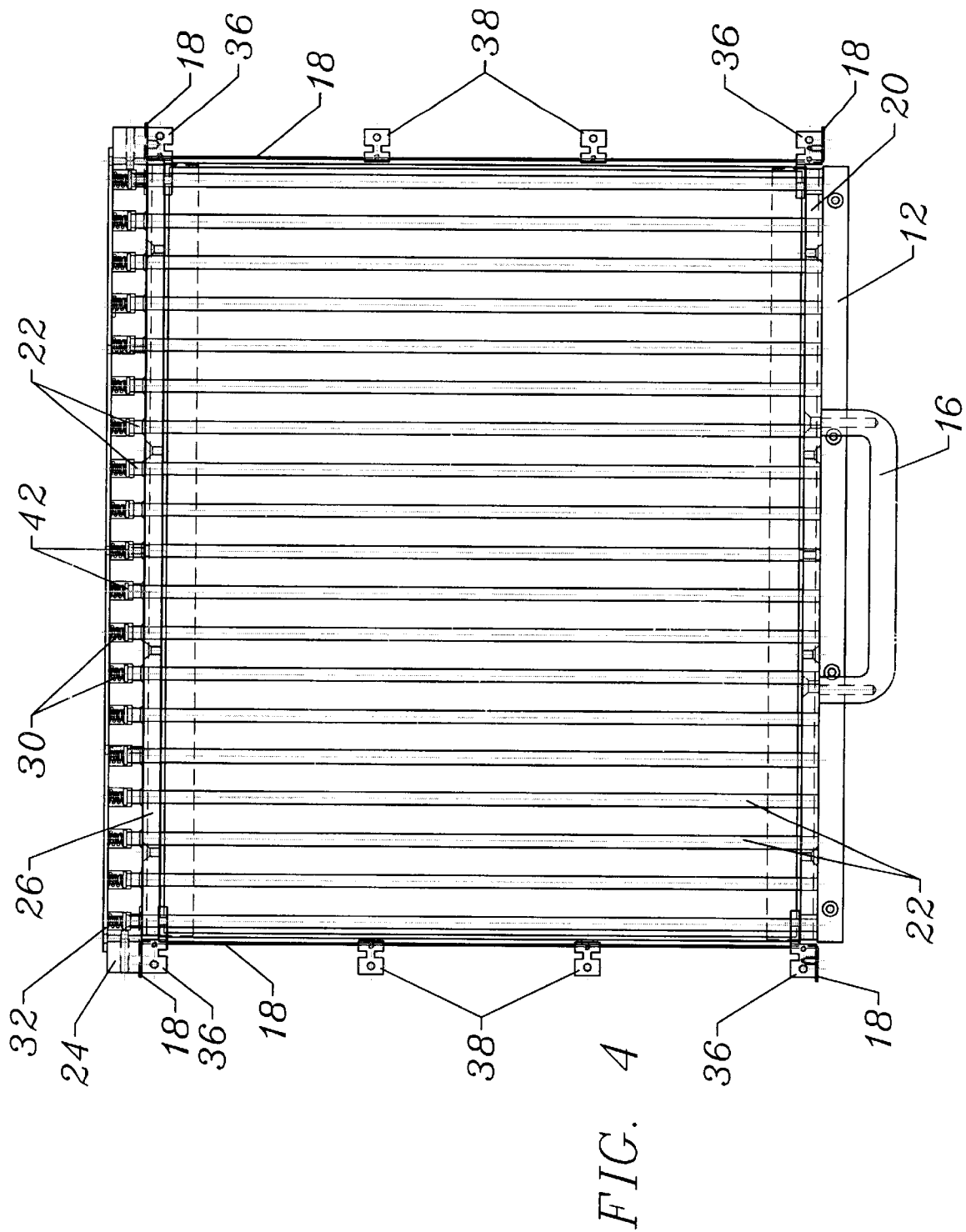
FIG. 4 is a plan view of an embodiment of the assembly of the present invention looking down from the top of the test cage.
Figure 6:
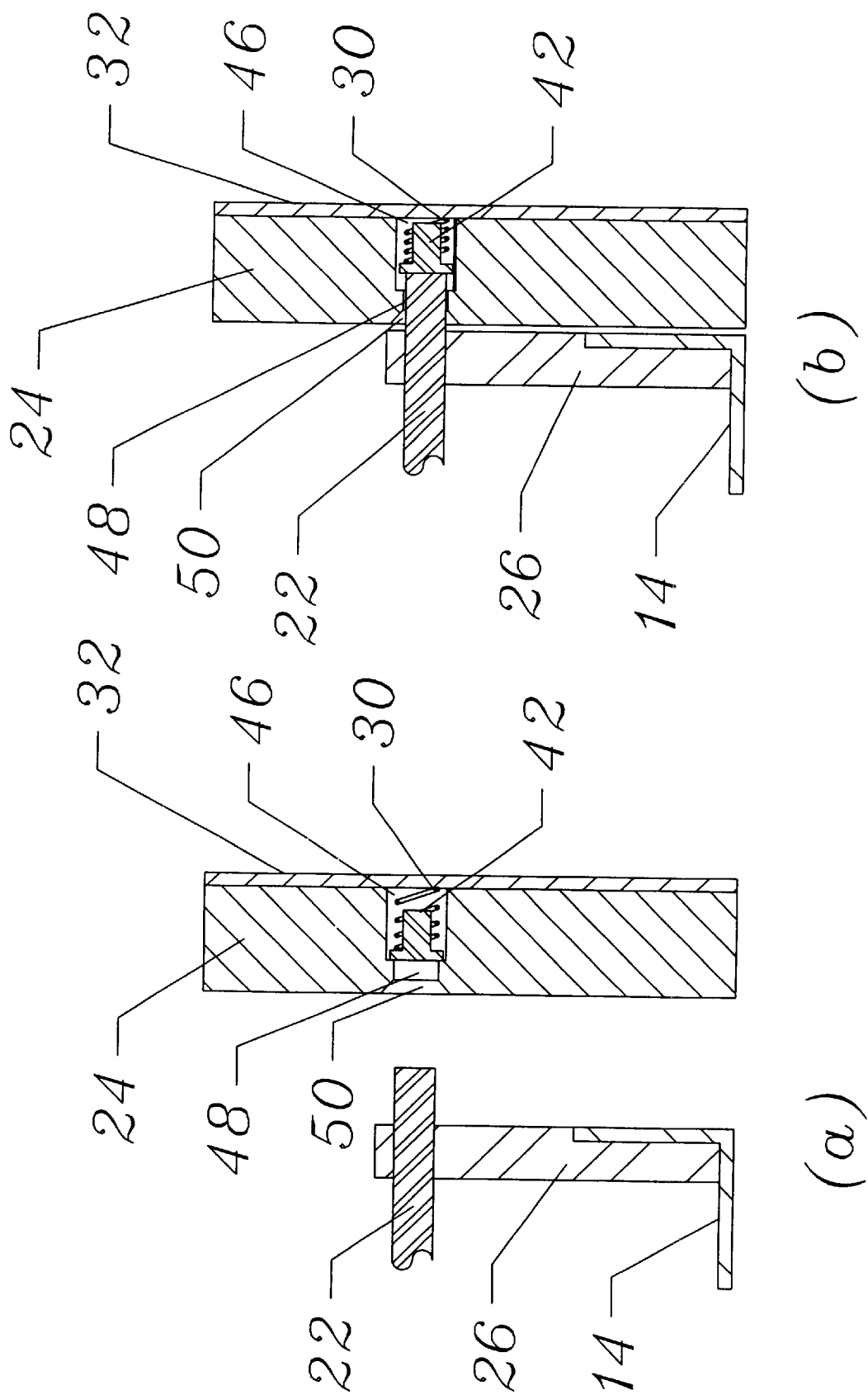
FIG. 6A shows in detail the relationship of the rear floor support of one embodiment of the assembly to the contact block.
FIG. 6B details the articulation and insertion of the assembly into the contact block.

Referring now to FIG. 6A, each contact hole 50 traverses completely through contact block 24. Each contact hole 50 has a bipartite diameter. The front cavity 48 of each hole 50 is cut so as to snugly receive the extension of the floor bar 22 that extends past rear floor support 26. The rear cavity 46 of each hole 50 is cut to accommodate the diameter of the head of contact pin 24. Thus, as FIGS. 5 and 6 show, a contact pin 42 is inserted into each contact hole 50 from the rear side of contact block 24. Once the pin 42 is inserted, a contact spring 30 is then inserted into each contact hole 50 from the rear side. The diameter of the contact spring 30 is smaller than the head of the contact pin 24. In this way, as FIG. 6A shows, a contact spring 30 surrounds and houses a contact pin 42 in each rear cavity 46, but cannot pass over the head of the contact pin 42. Moreover, the head of each contact pin is larger than the aperture to the front cavity 48. This insures the following: that the contact pin 42 does not enter front cavity 48 and that the floor bar 22, when properly inserted into the contact block, pushes on the spring-pin combination 42-30 and causes the combination to make proper and continuous contact with the contact plate With continuing reference to FIGS. 4 and 7, FIGS. 6A and B illustrate that, upon inserting the quick change floor and waste collection assembly 4 into cage 10 the extensions of the floor bars 22 enter the front cavity 48 in contact block 24. Floor bars 22 exert continuous pressure on the spring-pin 30-42 combination and cause the spring to coil within rear cavity 46. As the ends of floor bars 22 are positioned to fit snugly into contact holes 50, the front of the assembly 4 is drawn past the front lock bar 12. It is only when the front of the assembly clears the front lock bar 12 that the front of the assembly drops down into a locked-in position behind front lock bar 12. See FIG. 1.

Proper positioning of the quick change floor and waste collection assembly of the present invention creates continuous tension between front floor support 20 and contact block 24, which provides a locking-in mechanism that prevents the assembly from popping out of the cage while one or more test animals are using it. Moreover, in the embodiment of the assembly that comprises a circuit board in contact plate 32 and electrically conductive floor bars 22, the locking-in mechanism and continuous tension keep the contact springs 30 taut and in contact with the contact points of circuit board of contact plate 32. This in turn maintains the integrity of the cage and assembly as an electroconductive circuit and allows shock experimentation to be conducted at will, on an as needed basis.

The results of creating an electro-conductive circuit by continuous, locking-in tension when a quick-clean floor and waste assembly is inserted into the cage are twofold. First, the cage or assembly of the present invention allows a researcher to conduct shock or non-shock experiments on test animals housed therein. At the same time, the present invention provides a way to quickly remove the traces of the previous test animal from the cage by simply pulling the used, soiled assembly out of the cage and inserting a fresh, cleaned one. In this way, the present invention allows a researcher to almost instantaneously de-scent and sanitize a test animal chamber and change the test animal housed therein to begin a new research protocol.

Figure 7:
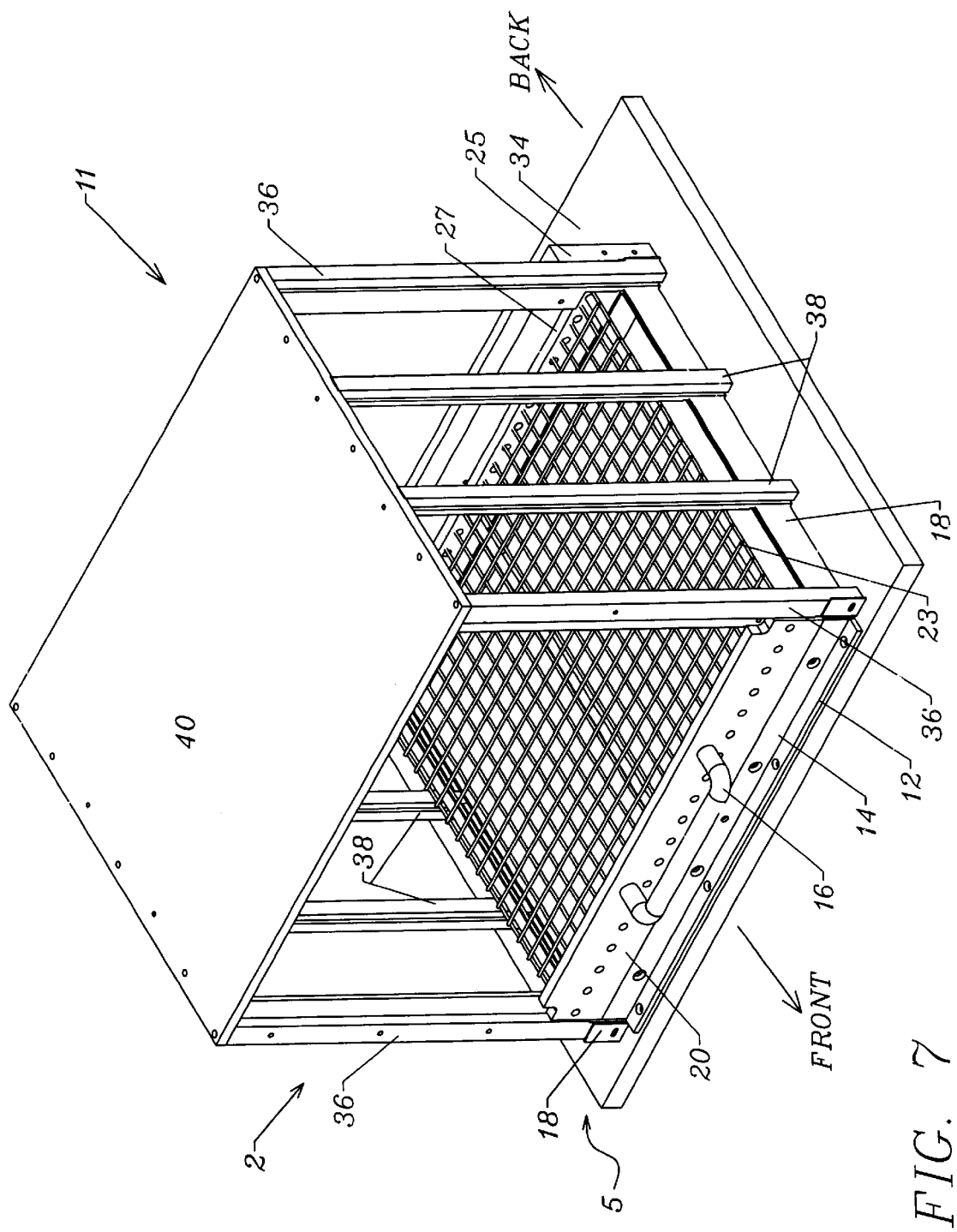
FIG. 7 shows an alternative embodiment of the cage of the present invention, showing a mesh floor.
Figure 8:
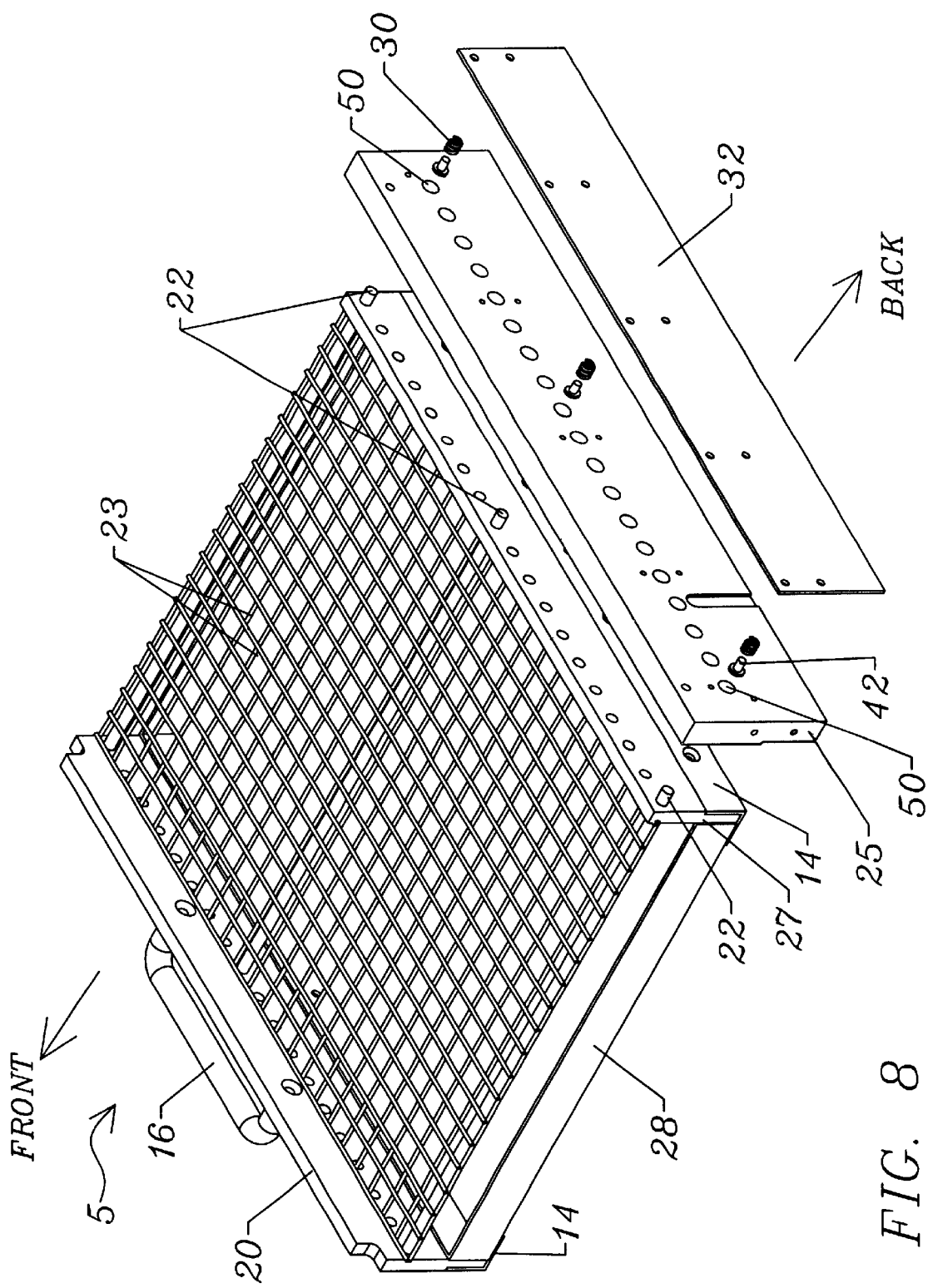
FIG. 8 shows an assembly of the alternative embodiment illustrated in FIG. 7, depicting an exploded view of the hardware residing in and connected to the contact block as well as the relationship of the floor to the rear floor support and to the contact block.

FIG. 7 shows an alternative embodiment wherein quick change floor and waste collection assembly 5 comprises a floor constructed of mesh 23, supported at the ends and in the middle by floor bars 22. Depending on research needs, the mesh of floor 23 could be metal or alternatively plastic, nylon, rubber, or other electrically non-conductive materials. The mesh of floor 23 must be sufficiently tightly woven and of sufficient rigidity and durability so that the mesh does not warp or tear and supports the animal's weight during experimentation. In the embodiment of assembly 5, suitable for conducting both shock and non-shock experimentation, the mesh floor 23 would end at rear floor support 27. The floor bars 22 extend through rear floor support 27 and make contact with contact block 25 in a manner similar to the previously described embodiment that comprised a floor of grid bars. In the mesh floor embodiment, the number of bars may be considerably reduced, being used solely to support the mesh and to create the electrical connection between the circuit board of contact plate 32 and the mesh floor 23.

As described above, certain embodiments of the present invention comprise elements of conductive material as well as a circuit board, thereby permitting shock and non-shock tests to be conducted, as needed. Alternatively, a wholly non-conductive embodiment of the present invention may be constructed to accommodate those research situations in which electromagnetic radiation to the test animal is kept to a minimum, such as when the experiment demands measuring the animal's own radiation. For example, referring to FIG. 2, the waste pan supports 14, the front handle 16, the guide rails 18, and the waste pan 28 may be constructed of plastic, rubber or any other suitable electrically non-conductive material. Front floor support 20, rear floor support 26 or 27 and contact block 24 or 25 may be constructed of wood, laminated wood or a composite wood product, such as pressboard. In the non-conductive embodiment, the contact plate would not comprise a circuit board. Further, contact springs 30 and contact pins 42 may be of plastic or other suitable material. The floor bars 22 in FIGS. 1–4, 8 may be glass, acrylic or other plastic that are designed and constructed to accommodate the weight of the largest animal or the greatest number of animals housed in the cage together.

With any of these embodiments, the size of the cage or concomitantly the size of the quick change floor and waste collection assembly is not a limiting factor to the usefulness of the present invention. The cage, as well as the floor and waste collection assembly, of the present invention is effective in any size suitable for a wide range of test animals, from the small, such as mice and other rodents, to the great, such as chimpanzees and large dogs. The more important consideration is to ensure that the quick change floor and waste collection assembly is sized to the cage in which it is used so that there is a continuous, sufficient tension that locks the assembly into position.

Insertion, Removal and Cleaning of Floor and Waste Pan

Referring to FIG. 1 and FIG. 7, a user inserts the quick change floor and waste pan assembly 4 or 5 by gliding the assembly along guide rails 18 until the extending portions of the floor bars 22 fit snugly into contact holes 50 in the contact block 24 or 25. The extending portions of the floor bars 22 continuously press on contact springs 30 residing in the rear cavity 46 of contact holes 50 when the assembly is properly positioned. A user has properly positioned the rear surface of the assembly into the contact block when the front floor support 20 clears the front lock bar 12 and drops down into a locked position behind it.

To remove the assembly, a user, grasping the front handle 16, pulls up on the front section of the assembly to clear the front lock bar 12 and then slides the assembly out of the cage. At this point, the researcher may place the entire assembly into a mechanized cleaning apparatus known in the art, whereby the assembly is cleaned using a known industrial method, which removes scent traces of the previous test animal and sanitizes the assembly. Of course, hand cleaning of the assembly is an alternative.

A researcher may remove the waste pan to empty it before cleaning the assembly. Referring to FIG. 3, a user disengages the waste pan 22 from the assembly by removing the single screw, bolt or the like as indicated by B, which connects the front waste pan support 14 to the waste pan. The waste pan may then be slid out laterally from the assembly.

A research can create a quick change test chamber by having more than one assembly on hand. In this way, a researcher can remove a soiled assembly and insert a clean one, thereby allowing an almost instantaneous change of the test animal in the test chamber. During the experimentation, by causing the soiled assembly to be cleaned, the researcher ensures a quick change of the assembly when needed.

Moreover, a researcher may practice a method of quickly changing a test animal in several ways. A researcher may use the cage of the present invention, which includes those elements of the cage structure that position the floor and waste collection assembly into the cage, namely, the front lock bar and the contact block, along with the removable, disconnectable floor and waste collection assembly. Alternatively, a researcher may use the floor and waste collection assembly of the present invention with other cages, be they fixed or modular, simply by modifying the cage to include a front lock bar and a contact block so that a floor and waste collection assembly of the present invention inserts into the contact block causing the floor bars of the assembly to create a contact with the contact plate when the front of the assembly is positioned behind the front lock bar.

Since the invention may undergo structural changes and experience various applications of use within its scope, this description is not intended to limit the invention to the disclosed forms but to cover those modifications, changes, alternative constructions and methods falling with the scope of the principle taught here.

What is claimed is:

1. A cage for laboratory animals comprising:
    a. a frame, and
    b. a floor and waste collection assembly, said frame comprising
        bottom and top walls;
        front, rear and side walls;
        a plurality of corner supports and side supports;
        lateral guide strips;
        a front lock bar; and
        a contact block,
    said contact block comprising
        a plurality of holes cut therethrough;
        a plurality of contact springs, one spring being housed in each of said holes
        a plurality of contact pins, one pin being inserted into each of said holes so as to be housed by each of said springs and thereby forming a plurality of pin-spring combinations, and
        a contact plate oriented so that it is contacted by each spring upon positioning of the floor and waste collection assembly into the cage frame behind the front lock bar, said floor and waste collection assembly comprising
- a floor subassembly and
- a waste pan, said floor subassembly comprising
- a front floor support with a handle,
- a rear floor support,
- at least one floor bar, and
- a plurality of waste pan supports, whereby the at least one floor bar is sized to fit snugly into at least one hole in said contact block, thereby causing each pin-spring combination to touch the contact plate when the floor and waste collection assembly is positioned behind the front lock bar.

2. The cage of claim 1, wherein the elements of the frame and the elements of the floor and waste collection assembly are electrically non-conductive material.

3. The cage of claim 2, wherein the floor subassembly further is a electrically non-conductive mesh floor.

4. The cage of claim 1, wherein the contact plate comprises a circuit board having contact points that correspond to where each pin-spring combination contacts the contact plate when the floor and waste collection assembly is positioned behind the front lock bar.

5. The cage of claim 4, wherein the floor subassembly further comprises a mesh floor.

6. A floor and waste collection assembly adapted for use in a cage for laboratory animals, said cage comprising a front lock bar and a contact block adapted to conduct electrical current from contact points on the contact block to at least one floor bar in contact with said contact points, wherein said assembly comprises
- a floor subassembly and
- a waste pan, and said floor subassembly comprising
- a front floor support with a handle,
- a rear floor support
- at least one floor bar, and
- a waste pan support, wherein the at least one floor bar is sized to fit snugly into at least one hole in the contact block of the cage, thereby creating a contact with the contact block when the assembly is positioned behind the front lock bar of the cage.

7. The assembly of claim 6, wherein the floor subassembly further comprises a mesh floor.

8. The assembly of claim 6, wherein the elements of the floor and waste collection assembly are electrically non-conductive material.

9. The assembly of claim 7, wherein the floor subassembly further is an electrically non-conductive mesh floor.

10. A method of using a floor and waste collection assembly adapted for use in a cage for laboratory animals, whereby a soiled assembly or one bearing scent traces from a previous test animal may be replaced by a sanitized assembly, wherein a floor and waste collection assembly comprises a front floor support with a handle, a rear floor support, at least one floor bar, a waste pan support and a waste pan, and said cage comprises a front lock bar and a contact block adapted to conduct electrical current from contact points on the contact block to at least one floor bar in contact with said contact points when the assembly is positioned behind the front lock bar on the cage, comprising the steps of:

disconnecting the floor and waste assembly from contact with contact points of the contact block on pulling the handle of the front floor support so that the front of the assembly clears the front lock bar, removing the assembly from the cage, causing the assembly along with the waste pan to be cleaned of the waste and scent traces of the test animal previously housed in the cage, inserting a so-cleaned floor and waste collection assembly into the cage so that at least one floor bar makes contact with the contact points of the contact block of the cage when the front floor support is positioned behind the front lock bar of the cage.

11. The method of claim 10, further comprising the step of:

detaching the waste pan from the assembly.

12. The method of claim 10, further comprising the step of:

having on hand at least two floor and waste collection assemblies whereby a second assembly cleaned of the waste and scent traces of a test animal may be inserted into the cage immediately following the detachment and removal from the cage of a first assembly needing to be cleaned.

\* \* \* \* \*